United States Patent
Hirano et al.

(10) Patent No.: US 10,150,347 B2
(45) Date of Patent: Dec. 11, 2018

(54) VEHICULAR AIR CONDITIONING DEVICE

(71) Applicant: MAZDA MOTOR CORPORATION, Hiroshima (JP)

(72) Inventors: Takuo Hirano, Higashihiroshima (JP); Takahiko Miura, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 153 days.

(21) Appl. No.: 15/110,063

(22) PCT Filed: Jan. 14, 2015

(86) PCT No.: PCT/JP2015/050768
§ 371 (c)(1),
(2) Date: Jul. 6, 2016

(87) PCT Pub. No.: WO2015/111477
PCT Pub. Date: Jul. 30, 2015

(65) Prior Publication Data
US 2016/0332503 A1    Nov. 17, 2016

(30) Foreign Application Priority Data
Jan. 21, 2014  (JP) .................................. 2014-008275

(51) Int. Cl.
*B60H 1/00* (2006.01)
*B60L 1/00* (2006.01)
(Continued)

(52) U.S. Cl.
CPC ..... *B60H 1/00764* (2013.01); *B60H 1/00392* (2013.01); *B60H 1/143* (2013.01);
(Continued)

(58) Field of Classification Search
CPC ................. H02P 27/085; H02M 7/37
(Continued)

(56) References Cited

U.S. PATENT DOCUMENTS 6,363,732 B1    4/2002  Bluhm
2005/0210897 A1*  9/2005  Oomura ............... B60H 1/3216
                                          62/186
(Continued)

FOREIGN PATENT DOCUMENTS

JP    H05-238245 A    9/1993
JP    2009-190442 A    8/2009
(Continued)

OTHER PUBLICATIONS

International Search Report issued in PCT/JP2015/050768; dated Mar. 31, 2015.

*Primary Examiner* — Steven B McAllister
*Assistant Examiner* — John Bargero
(74) *Attorney, Agent, or Firm* — Studebaker & Brackett PC

(57) ABSTRACT

In a vehicular air conditioning device, a heater core is disposed on a circulation passage for cooling water for cooling a motor, and an inverter configured to control an output of the motor by changing a carrier frequency, and heats conditioning air. An air conditioning controller sets a required calorific value of the motor and the inverter according to a vehicle compartment temperature requested by a passenger. A carrier frequency changing unit sets a carrier frequency at which a calorific value of the motor and the inverter is made equal to the required calorific value, out of carrier frequencies capable of implementing a target output of the motor to be set depending on a traveling state of a vehicle. An electric power conversion device converts direct-current power of a battery into alternating-current power at the set carrier frequency, and supplies the alternating-current power to the motor.

11 Claims, 5 Drawing Sheets

(51) Int. Cl.
| | |
|---|---|
| *B60L 3/00* | (2006.01) |
| *B60L 7/14* | (2006.01) |
| *B60L 11/18* | (2006.01) |
| *B60L 15/20* | (2006.01) |
| *B60H 1/14* | (2006.01) |
| *B60H 1/22* | (2006.01) |
| *B60K 11/02* | (2006.01) |
| *B60K 1/00* | (2006.01) |

(52) U.S. Cl.
CPC ............... *B60H 1/22* (2013.01); *B60L 1/003* (2013.01); *B60L 3/003* (2013.01); *B60L 3/0061* (2013.01); *B60L 7/14* (2013.01); *B60L 11/1803* (2013.01); *B60L 11/1861* (2013.01); *B60L 15/20* (2013.01); *B60L 15/2009* (2013.01); *B60H 2001/00307* (2013.01); *B60H 2001/224* (2013.01); *B60K 11/02* (2013.01); *B60K 2001/003* (2013.01); *B60K 2001/006* (2013.01); *B60L 2240/12* (2013.01); *B60L 2240/34* (2013.01); *B60L 2240/36* (2013.01); *B60L 2240/421* (2013.01); *B60L 2240/423* (2013.01); *Y02T 10/644* (2013.01); *Y02T 10/645* (2013.01); *Y02T 10/705* (2013.01); *Y02T 10/7005* (2013.01); *Y02T 10/7044* (2013.01); *Y02T 10/7275* (2013.01)

(58) Field of Classification Search
USPC .......................................................... 237/5
See application file for complete search history.

(56) References Cited

U.S. PATENT DOCUMENTS

| | | | | |
|---|---|---|---|---|
| 2009/0309551 | A1* | 12/2009 | Lazarovich | H02J 7/0073 320/138 |
| 2010/0052583 | A1* | 3/2010 | Takamatsu | B60L 11/18 318/400.09 |
| 2012/0049664 | A1 | 3/2012 | Yokoyama et al. | |
| 2014/0000860 | A1* | 1/2014 | Nishizawa | B60L 1/003 165/202 |
| 2016/0318499 | A1* | 11/2016 | Yamanaka | B60W 10/06 |

FOREIGN PATENT DOCUMENTS

| | | |
|---|---|---|
| JP | 2012-051386 A | 3/2012 |
| JP | 2013-059159 A | 3/2013 |
| WO | 2012/120630 A1 | 9/2012 |

* cited by examiner

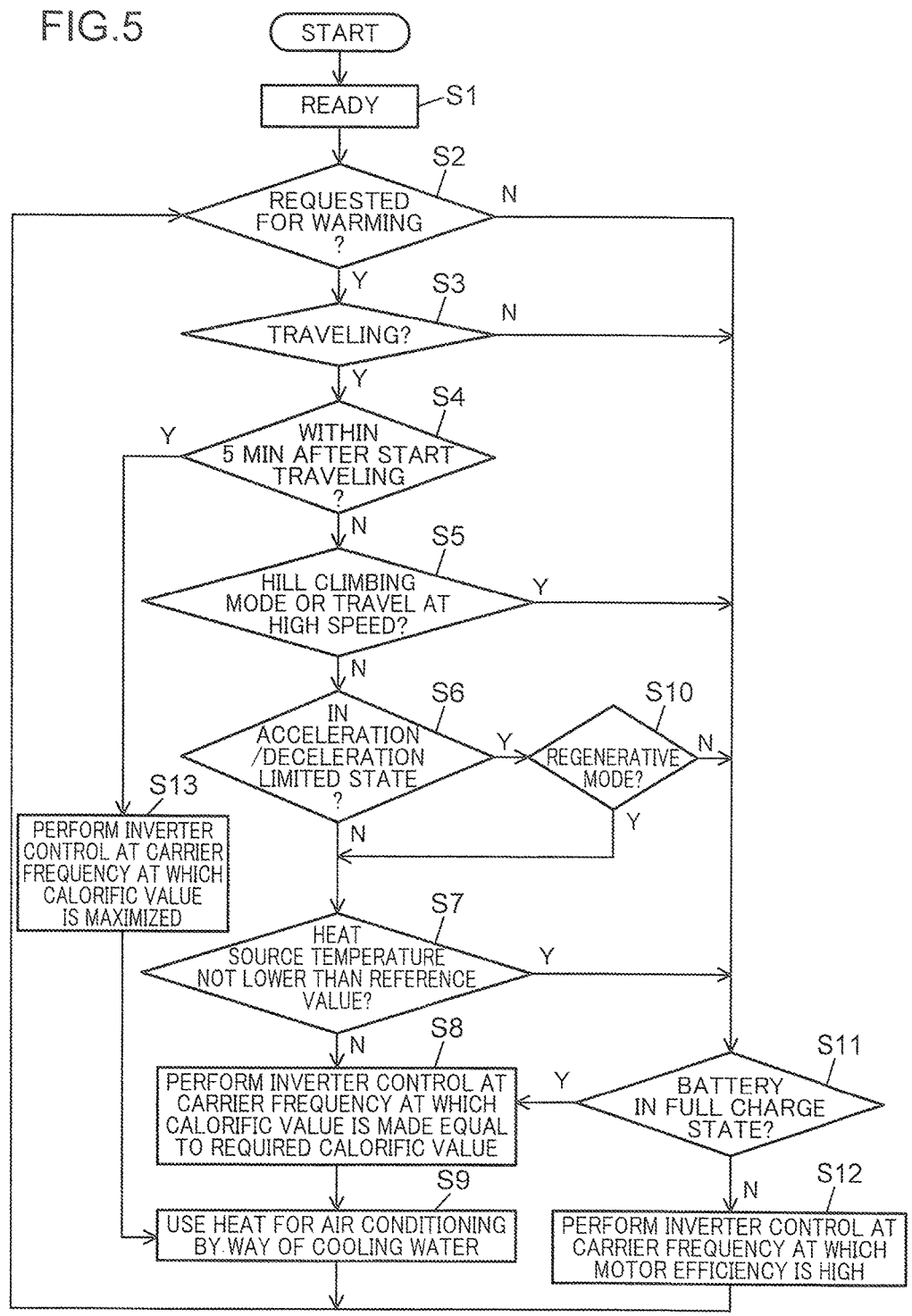

VEHICULAR AIR CONDITIONING DEVICE

TECHNICAL FIELD

The present invention relates to a vehicular air conditioning device for air conditioning the space inside a vehicle compartment, and more particularly, to an air conditioning device for a vehicle provided with a motor as a drive source.

BACKGROUND ART

In a vehicle provided with a motor as a drive source, such as an electric vehicle or a hybrid vehicle, direct-current power of a battery is converted into alternating-current power by an inverter, and the alternating-current power is supplied, to the motor. An output of a motor is controlled by changing a carrier frequency of an inverter in performing electric power conversion. The carrier frequency of an inverter is not uniquely determined with respect to an output of a motor. For instance, when a target output of a motor is set depending on a traveling state of a vehicle, there exist a plurality of carrier frequencies capable of implementing the target output. Conventionally, electric power conversion is performed by a carrier frequency at which motor efficiency is as high as possible (i.e. motor loss is as small as possible) among the carrier frequencies according to the use conditions.

Patent Literature 1 discloses a vehicle provided with a motor as a drive source. The vehicle is configured such that motor loss is increased by temporarily setting a carrier frequency high during a gear shift operation. Thus, motor efficiency is lowered for reducing a torque.

CITATION LIST

Patent Literature

Patent Literature 1: Japanese Unexamined Patent Publication No. 2009-190442

SUMMARY OF INVENTION

As compared with a vehicle provided only with e.g. an internal combustion engine, a vehicle provided with a motor as a drive source is likely to be short of a heat source for warming the interior of a vehicle compartment. In view of the above, an electric heater or the like may be added to an air conditioning device for conditioning the air in the space inside a vehicle compartment. Adding an electric heater or the like, however, may cause an increase in the weight and the cost of a vehicle, and an increase in electric power consumption.

An object of the present invention is to solve the aforementioned problem involved in an air conditioning device for a vehicle provided with a motor as a drive source, specifically, to provide a vehicular air conditioning device that enables to secure a heat source for warming the interior of a vehicle compartment without adding an electric, heater or the like.

In view of the above, the present invention is directed to an air conditioning device for use in a vehicle provided with a motor as a drive source, and an inverter for controlling an output of the motor by changing a carrier frequency. The vehicular air conditioning device includes a heater core disposed on a circulation passage for coolant for cooling at least one of the motor and the inverter, and configured to heat conditioning air by using the coolant as a heat source; a required calorific value setting means which sets a required calorific value of the motor and the inverter according to a vehicle compartment temperature requested by a passenger; a carrier frequency setting means which sets a carrier frequency at which a calorific value of the motor and the inverter is made equal to the required calorific value set by the required calorific value setting means, out of carrier frequencies capable of implementing a target output of the motor to be set depending on a traveling state of the vehicle; and an electric power conversion means which converts direct-current power of a power storage device into alternating-current power at the carrier frequency set by the carrier frequency setting means, and supplies the alternating-current power to the motor.

These and other objects, features and advantages of the present invention will become more apparent upon reading the following detailed description along with the accompanying drawings.

BRIEF DESCRIPTION OF DRAWINGS

FIG, 4 is a diagram illustrating heat generating characteristics of the motor and the inverter that are displayed over the operating region of the motor when the carrier frequency of the inverter provided in the vehicle is 5 kHz; and FIG. 5 is a flowchart illustrating an example of a control operation of the vehicle.

DESCRIPTION OF EMBODIMENTS (1) Configuration of Air Conditioning Device

Figure 1:
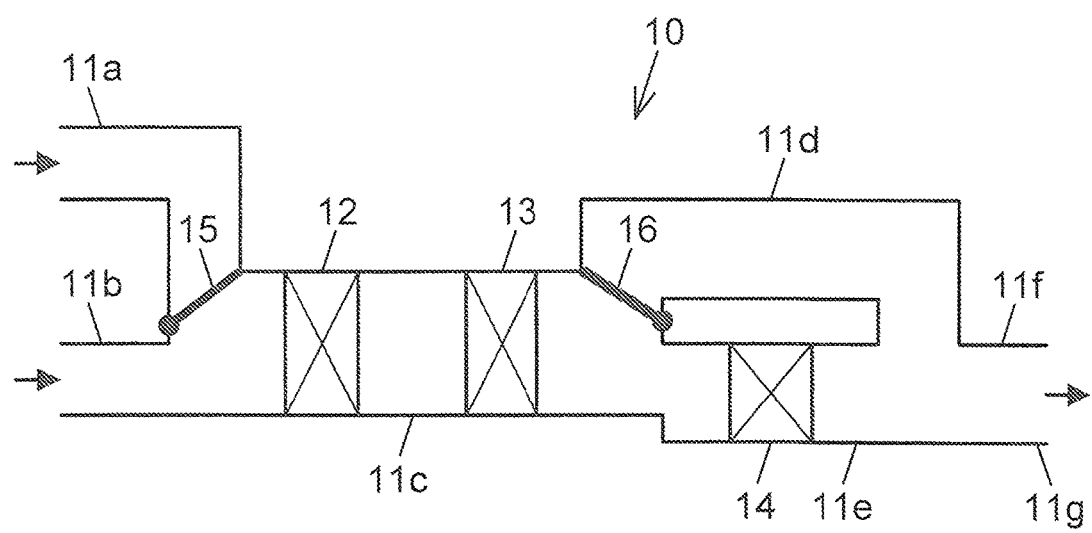
FIG. 1 is a block diagram illustrating a mechanical configuration of a vehicular air conditioning device embodying the present invention.

FIG. 1 is a block diagram illustrating a mechanical configuration of a vehicular air conditioning device 10 embodying the present invention. In the embodiment, unless otherwise specifically stated, the terms "upstream" and "downstream" refer to airflows in the air conditioning device 10.

Figure 2:
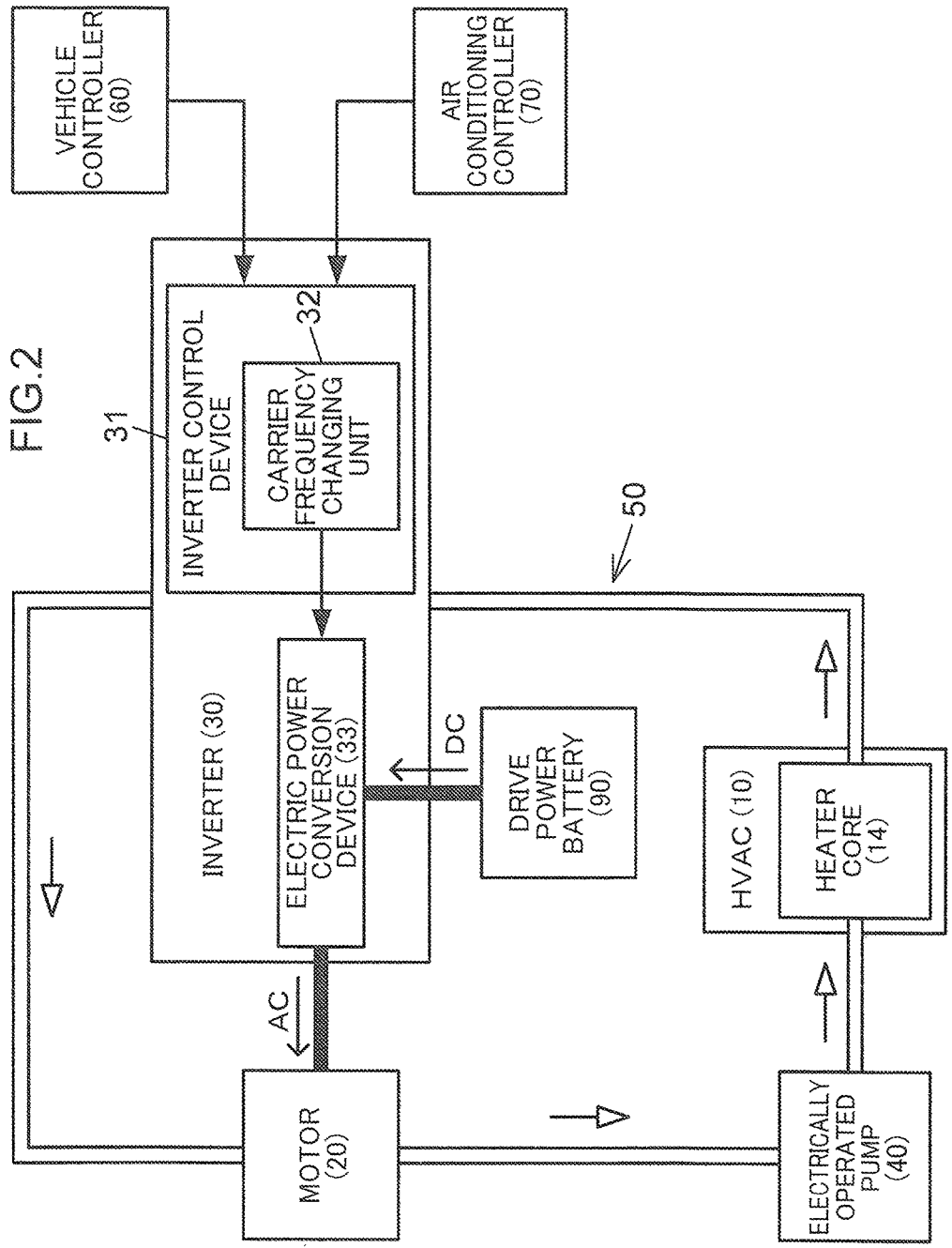
FIG. 2 is a block diagram illustrating a system configuration of an electric vehicle installed with the vehicular air conditioning device.

In the embodiment, the air conditioning device 10 is installed in an electric vehicle, which is not provided with an internal combustion engine as a drive source, but is provided only with a motor 20 (see FIG. 2). The air conditioning device 10 is disposed on a front portion of a vehicle compartment, and conditions the air in the space inside the vehicle compartment. The air conditioning device 10 includes an external air inlet passage 11a for introducing air (external air) in the space outside a vehicle into the air conditioning device 10, and an internal air inlet passage 11b for introducing air (internal air) in the space inside a vehicle compartment into the air conditioning device 10.

A main duct passage 11e is connected to a downstream end of the external air inlet passage 11a and to a downstream end of the internal air inlet passage 11b. A downstream end of the main duct passage 11e is connected to a cooling passage 11d and to a warming passage 11e. A blowout passage 11f is connected to a downstream end of the cooling passage 11d and to a downstream end of the warming passage 11e.

A plurality of blowout ports 11g for blowing air (conditioned air) that is cooled, heated or dehumidified by the air conditioning device 10 into the space inside a vehicle compartment are formed in a downstream end of the blowout passage 11f. The blowout ports 11g include a vent blowout port for blowing conditioned air toward the upper half body of a front-seated passenger, a heat blowout port for blowing conditioned air toward the feet of the front-seated passenger, a defroster blowout port for blowing conditioned air from the lower side upwardly toward the inner surface of a front wind shield (unillustrated), a rear vent blowout port for blowing conditioned air toward the upper half body of a rear-seated passenger, and a rear heat blowout port for blowing conditioned air toward the feet of the rear-seated passenger.

A blower fan 12 and an evaporator 13 are disposed in this order from the upstream side in the main duct passage 11c. A heater core 14 is disposed in the warming passage 11e.

An internal/external air switching damper 15 is disposed at a downstream end of the external air inlet passage 11a and at a downstream end of the internal air inlet passage 11b. The internal/external air switching damper 15 is configured to be locatable at any position between a position (internal air circulation position) where the external air inlet passage 11a is closed, and a position (external air introduction position) where the internal air inlet passage 11b is closed. According to this configuration, the opening angle ratio between the external air inlet passage 11a and the internal air inlet passage 11b is adjusted, and the mixing ratio between external air and internal air for conditioned air to be blown from the blowout ports 11g is appropriately adjusted.

The blower fan 12 is disposed downstream of the internal/external air switching damper 15. When the blower fan 12 is driven, conditioning air that is allowed to flow from the external air inlet passage 11a and from the internal air inlet passage 11b toward the blowout ports 11g is generated.

The evaporator 13 is a heat exchanger for cooling. The evaporator 13 is disposed downstream of the blower fan 12, and cools conditioning air.

A temperature control damper 16 is disposed at an upstream end of the cooling passage 11d and at an upstream end of the warming passage 11e. The temperature control damper 16 is configured to be locatable at any position between a position (a position in the warming mode) where the cooling passage 11d is closed, and a position (a position in the cooling mode) when the warming passage 11e is closed. According to this configuration, the opening angle ratio between the cooling passage 11d and the warming passage 11e is adjusted, and the temperature of conditioned air to be blown from the blowout ports 11g is adjusted appropriately.

The heater core 14 is a heat exchanger for warming. The heater core 14 is disposed downstream of the temperature control damper 16, and heats conditioning air. The heater core 14 is configured to allow cooling water for a motor 20 and an inverter 30 (see FIG. 2), which is usable as a heat source for warming the interior of a vehicle compartment, to pass through the heater core 14.

(2) System Configuration of Vehicle

FIG. 2 is a block diagram illustrating a system configuration of an electric vehicle installed with the vehicular air conditioning device 10. In FIG. 2, the air conditioning device 10 is illustrated as "HVAC", which is an abbreviation of "Heating, Ventilation and Air Conditioning".

In the embodiment, the electric vehicle is provided with the motor 20, the inverter 30 for controlling an output of the motor 20 by changing a carrier frequency, and a circulation passage 50 for cooling water for cooling the motor 20 and the inverter 30. The motor 20, the inverter 30, an electrically operated pump 40, and the heater core 14 of the air conditioning device 10 are disposed on the cooling water circulation passage 50. Cooling water is circulated by operating the electrically operated pump 40 in the order of the inverter 30→the motor 20→the electrically operated pump 40→the heater core 14→the inverter 30. A radiator for releasing heat of cooling water may be interposed between the heater core 14 and the inverter 30. Cooling water deprives heat from the inverter 30 and the motor 20 when passing the inverter 30 and the motor 20. When cooling water passes the heater core 14, the cooling water is used as a heat source in heating conditioning air by the heater core 14.

The inverter 30 includes an inverter control device 31 and an electric power conversion device 33. The inverter control device 31 is provided with a carrier frequency changing unit 32.

A vehicle controller 60 sets a target output (=target torque T×target rotation number N) of the motor 20 depending on a traveling state of a vehicle (e.g. when the vehicle starts traveling, when the vehicle is in a hill climbing mode, when the vehicle is maximally accelerated, when the vehicle travels in an urban area, when the vehicle travels through the suburbs, or when the vehicle travels at a high speed); and issues, to the inverter control device 31, the set target output together with an instruction on a target vehicle speed or regenerative deceleration.

The air conditioning controller 70 sets a required calorific value of the motor 20 and the inverter 30 according to a vehicle compartment temperature requested by a passenger, a temperature of internal air or a temperature of external air to be introduced into the air conditioning device 10, a temperature of cooling water that circulates through the cooling water circulation passage 50, a flow rate of conditioning air generated by driving the blower fan 12, or the like; and outputs the set required calorific value to the inverter control device 31. The air conditioning controller 70 corresponds to a required calorific value setting means of the present invention.

The inverter control device 31, the vehicle controller 60, and the air conditioning controller 70 are each a microcomputer of a well-known structure including a CPU, an ROM, and an RAM.

The carrier frequency changing unit 32 of the inverter control device 31 sets a carrier frequency at which a calorific value of the motor 20 and the inverter 30 is made equal to a required calorific value of the motor 20 and the inverter 30 set by the air conditioning controller 70 out of carrier frequencies capable of implementing a target output of the motor 20 set by the vehicle controller 60; and outputs the set carrier frequency to the electric power conversion device 33. The carrier frequency changing unit 32 corresponds to a carrier frequency setting means of the present invention.

The electric power conversion device 33 converts direct-current power (DC power) of a drive power battery 90 (corresponding to a power storage device of the present invention) into alternating-current power (AC power) by the carrier frequency set by the carrier frequency changing unit 32, and supplies the AC power to the motor 20. The electric power conversion device 33 corresponds to an electric power conversion means of the present invention.

The motor 20 functions as a regenerative alternator (power generator) when the vehicle is in a deceleration mode. In this case, the electric power conversion device 33 converts alternating-current power generated by the motor 20 into direct-current power, and supplies the direct-current power to the drive power battery 90.

(3) Content of Control

A carrier frequency is a period of a timer, which is operated at a predetermined period to turn on and off a pulse signal in a pulse width modulation system. A pulse width is controlled by setting, for the timer, a time position at which a pulse signal is turned on. The motor 20 and the inverter 30 generate heat when the electric power conversion device 33 converts direct-current power of the battery 90 into alternating-current power, and when the electric power conversion device 33 converts alternating-current power generated by the motor 20 into direct-current power when a vehicle is in a regenerative deceleration mode. The calorific value increases as the carrier frequency increases, because the number of times of generating heat per unit time by the motor 20 and the inverter 30 increases, as the carrier frequency increases.

Figure 3:
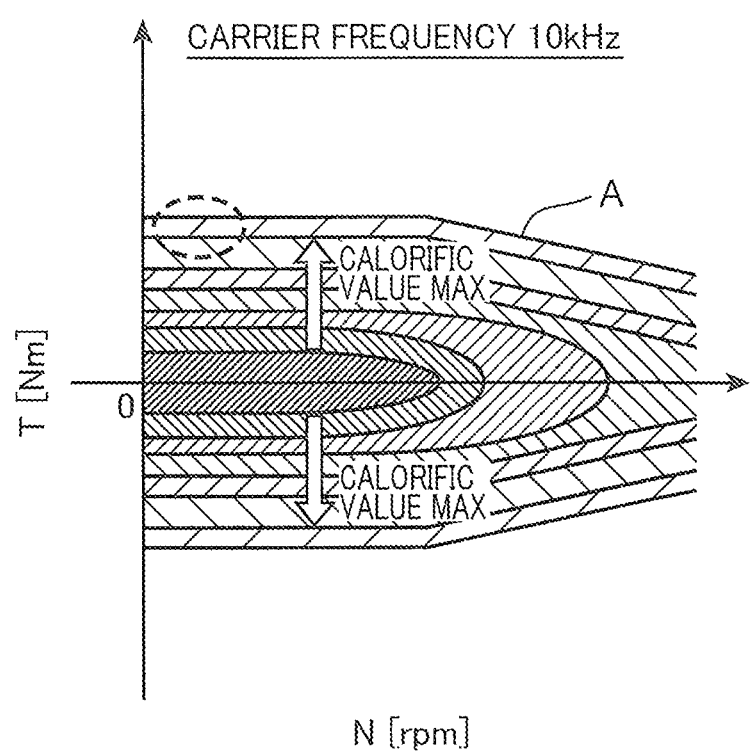
FIG. 3 is a diagram illustrating heat generating characteristics of a motor and an inverter that are displayed over an operating region of the motor when the carrier frequency of the inverter provided in a vehicle is 10 kHz.
Figure 4:
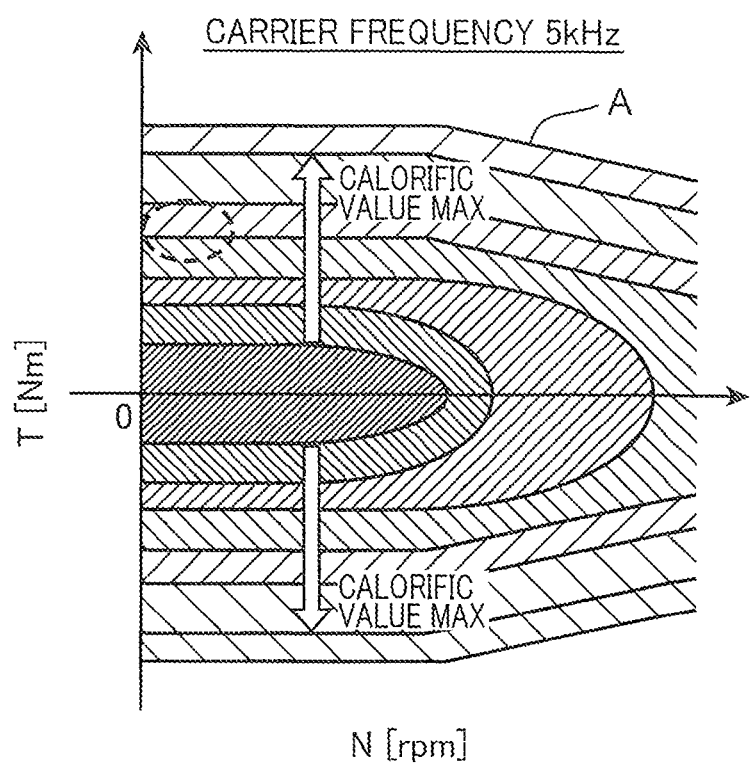

FIG. 3 and FIG. 4 are diagrams respectively illustrating heat generating characteristics of the motor 20 and the inverter 30 that are displayed over an operating region of the motor 20 when the carrier frequency of the inverter 30 is 10 kHz, and when the carrier frequency of the inverter 30 is 5 kHz. The heat generating characteristics are created in advance by conducting an experiment, and are stored in the inverter control device 31. The region surrounded by a speed-torque curve A (N-T characteristics), which represents a relationship between the rotation number N (also called as a speed) of the motor 20, and the torque T of the motor 20, is an operating region of the motor 20. The speed-torque curve A represents a maximum torque of the motor 20 at the associated speed. The motor 20 is operable in the whole region surrounded by the speed-torque curve A. The motor 20 has fixed torque characteristics that the torque T retains unchanged even when the speed changes in a low speed range, and has fixed output characteristics that the torque T lowers as the speed increases in a middle to high speed range.

In FIG. 3 and FIG. 4, the region on the upper side than zero (0) on the vertical axis is an operating region when the vehicle travels by the motor 20, and the region on the lower side than zero (0) on the vertical axis is an operating region when the vehicle is in a regenerative deceleration mode. In any of the regions, a calorific value increases, as the absolute value of the torque T increases. In FIG. 3 and FIG. 4, regions indicated by the same hatched patterns represent that calorific values are the same as each other.

In FIG. 3 and FIG. 4, it is assumed that the vehicle controller 60 sets a low-speed and middle-torque region indicated by the broken circle, as a target output of the motor 20 (e.g. when the vehicle starts traveling or when the vehicle is in a hill climbing mode). It is possible to implement the low-speed and middle-torque region both in the case where a carrier frequency is 10 kHz and the ease where a carrier frequency is 5 kHz. Note that, however, when a carrier frequency is 0 kHz, a calorific value of the motor 20 and the inverter 30 is large, as compared with the case where a carrier frequency is 5 kHz. In other words, motor efficiency is low (i.e. motor loss of the motor 20 is large). Conventionally, electric power conversion is performed by a carrier frequency at which motor efficiency is as high as possible. In this case. the carrier frequency changing unit 32 may set a carrier frequency to 5 kHz at which a calorific value is smaller.

On the other hand, in the embodiment, heat generated by the motor 20 and the inverter 30 is used for air conditioning. Therefore, the carrier frequency changing unit 32 and the electric power conversion device 33 do not perform electric power conversion by a carrier frequency (in the examples of FIG. 3 and FIG. 4, 5 kHz) at which motor efficiency is as high as possible, out of carrier frequencies capable of implementing a target output of the motor 20, but perform electric power conversion by a carrier frequency (in the examples of FIG. 3 and FIG. 4, 10 kHz) at which a required calorific value set by the air conditioning controller 70 is implementable in response to a passenger's request. In other words, in the embodiment, a calorific value of the motor 20 and the inverter 30 is actively controlled by intentionally using a carrier frequency at which motor efficiency is low (motor loss is large and a calorific value is large), unlike a conventional art in which control is performed based on the premise that motor efficiency is prioritized.

In the examples of FIG. 3 and FIG. 4, a required calorific value based on a request for air conditioning, and a maximum calorific value of the motor 20 and the inverter 30 are equal to each other by coincidence. Therefore, 10 kHz is selected as a carrier frequency. However, there is a case that a carrier frequency smaller than 10 kHz is selected when a required calorific value is smaller than a maximum calorific value.

FIG. 3 and FIG. 4 illustrate that it is possible to control heat generation by changing a carrier frequency. Changing a carrier frequency makes it possible to control an output of the motor 20, and to control a calorific value of the motor 20 and the inverter 30. In this case, it is possible to estimate a calorific value of the motor 20 and the inverter 30 with high precision, as far as an output of the motor 20 retains unchanged, because a calorific value basically depends solely on a carrier frequency. Thus, it is possible to implement a required calorific value with precision.

Note that during an initial stage after the motor 20 starts operating, a calorific value of the motor 20 and the inverter 30 is small. Therefore, a temperature of the motor 20 and a temperature of the inverter 30 are low, and a temperature of cooling water that circulates through the circulation passage 50 is also low. However, when warming the interior of a vehicle compartment is requested from an initial stage after the vehicle starts traveling, it is necessary to rapidly raise the temperature of cooling water from the initial stage after the motor 20 starts operating.

In view of the above, the carrier frequency changing unit 32 sets a carrier frequency (in the examples of FIG. 3 and FIG. 4, 10 kHz) at which a calorific value of the motor 20 and the inverter 30 is maximized, out of carrier frequencies capable of implementing a target output of the motor 20 until a predetermined time (e.g. 5 minutes) lapses after the motor 20 starts operating, no matter how large or small a required calorific value set by the air conditioning controller 70 is. According to this configuration, a carrier frequency at which a calorific value of the motor 20 and the inverter 30 is maximized is set until a predetermined time lapses after the motor 20 starts operating. This makes it possible to raise the temperature of cooling water as fast as possible during an initial stage after the motor 20 starts operating, during which it is necessary to rapidly heat the cooling water. Thus, it is possible to secure a heat source for warming the interior of a vehicle compartment in an early stage, and to implement an optimum air conditioned state with enhanced responsiveness to a passenger's request for warming from an initial stage after the vehicle starts traveling.

After the predetermined time elapses (in a middle stage after the vehicle starts traveling, or thereafter), the vehicle may travel in a state that motor efficiency is prioritized by setting a carrier frequency to a lower value and reducing a calorific value of the motor 20 and the inverter 30, The predetermined time is, for instance, a time required for a temperature of cooling water to reach a temperature (e.g. from 40 to 50° C.) usable for air conditioning.

When the temperature of cooling water is lowered or when a vehicle compartment temperature requested by a passenger is raised during traveling in a state that motor efficiency is prioritized, a carrier frequency is set to a higher value again, while retaining a target output of the motor 20 unchanged. Thus, the calorific value of the motor 20 and the inverter 30 is increased to heat the cooling water again. Repeating traveling in a state that heat generation is promoted, and traveling in a state that motor efficiency is set high as described above makes it possible to effectively use heat of cooling water, which is discharged from a radiator as waste heat in the conventional art, as a heat source for air conditioning.

Further, securing a target output of the motor 20 set by the vehicle controller 60 by 100% may be prioritized depending on a traveling state of a vehicle e.g., when the vehicle is in a hill climbing mode or when the vehicle travels at a high speed. This may lead to a difficulty in securing a required calorific value of the motor 20 and the inverter 30 set by the air conditioning controller 70 by 100%. In view of the above, the inverter control device 31 transmits, to the air conditioning controller 70, a signal indicating that it is possible to secure a required calorific value by e.g. 80%. In response to the signal, the air conditioning controller 70 may reduce the flow rate of conditioning air by driving the blower fan 12 to keep a temperature of conditioned air to be blown from the blowout ports 11g to a vehicle compartment temperature requested by a passenger. In this case, the inverter control device 31 corresponds to a securable calorific value setting means of the present invention, and the air conditioning controller 70 corresponds to a conditioned air flow rate reducing means of the present invention.

FIG. 5 is a flowchart illustrating an example of a control operation of an electric vehicle in the embodiment.

In Step S1, the electric power conversion device 33 is set to a READY state (a state that the electric power conversion device 33 is ready to start an operation). Then, in Step S2, the inverter control device 31 determines whether there is a warming request from the air conditioning controller 70. When the determination result in Step S2 is YES, the routine proceeds to Step S3, and when the determination result in Step S2 is NO, the routine proceeds to Step S11.

In Step S3, the vehicle controller 60 determines whether the vehicle is traveling. When the determination result in Step S3 is YES, the routine proceeds to Step S4, and when the determination result in Step S3 is NO, the routine proceeds to Step S11.

In Step S4, the inverter control device 31 determines whether the time is within 5 minutes after the vehicle starts traveling. When the determination result in Step S4 is YES (the time is within an initial stage after the vehicle starts traveling), the routine proceeds to Step S13, and when the determination result in Step S4 is NO (the time is within a middle stage after the vehicle starts traveling, or thereafter), the routine proceeds to Step S5.

In Step S5, the vehicle controller 60 determines whether the vehicle is in a hill climbing mode or when the vehicle travels at a high speed. This determination can be made based on the operating regions of the motor 20 illustrated in FIG. 3 and FIG. 4, for instance. When a target output of the motor 20 is set in a low-speed and middle-torque region, it is determined that the vehicle is in a hill climbing mode. When a target output of the motor 20 is set in a high-speed and low-torque region, it is determined that the vehicle travels at a high speed. When the determination result in Step S5 is YES (when it is difficult to secure a required calorific value of the motor 20 and the inverter 30 set by the air conditioning controller 70 by 100%), the routine proceeds to Step S11. When the determination result in Step S5 is NO (when it is possible to secure a required calorific value of the motor 20 and the inverter 30 set by the air conditioning controller 70 by 100%), the routine proceeds to Step S6.

In Step S6, the inverter control device 31 determines whether the vehicle is in an acceleration/deceleration limited state. In other words, it is determined whether controlling an output of the motor 20 by changing a carrier frequency by the inverter 30 is limited. When the determination result in Step S6 is YES, the routine proceeds to Step S10, and when the determination result in Step S6 is NO, the routine proceeds to Step S7.

In Step S10, the vehicle controller 60 determines whether the vehicle is in a regenerative deceleration mode. When the determination result in Step S10 is YES, the routine proceeds to Step S7, and when the determination result in Step S10 is NO, the routine proceeds to Step S11. The reason why the routine proceeds to Step S7 when the determination result in Step S10 is YES is, as described above, the motor 20 and the inverter 30 also generate heat when the vehicle is in a regenerative deceleration mode, and it is possible to actively control a calorific value of the motor 20 and the inverter 30.

In Step S7, the air conditioning controller 70 determines whether a heat source temperature (a temperature of cooling water or a temperature of the heater core 14) is not lower than a reference value (a temperature usable for air conditioning (e.g. from 40 to 50° C.)). When the determination result in Step S7 is YES, the routine proceeds to Step S11, and when the determination result in Step S7 is NO, the routine proceeds to Step S8.

In Step S8, the carrier frequency changing unit 32 and the electric power conversion device 33 performs inverter control i.e. electric power conversion at a carrier frequency capable of promoting heat generation. Specifically, electric power conversion is performed at a carrier frequency at which a calorific value of the motor 20 and the inverter 30 is made equal to a required calorific value of the motor 20 and the inverter 30 set by the air conditioning controller 70 out of carrier frequencies capable of implementing a target output of the motor 20. Thus, a calorific value of the motor 20 and the inverter 30 is actively controlled by intentionally using a carrier frequency at which motor efficiency is low (motor loss is large and a calorific value is large). Then, in Step S9, heat generated by the motor 20 and the inverter 30 is used for air conditioning by way of cooling water.

On the other hand, when the determination result in Step S4 is YES and the routine proceeds to Step S13, the carrier frequency changing unit 32 and the electric power conversion device 33 also perform inverter control i.e. electric power conversion at a carrier frequency capable of promoting heat generation. Specifically, electric power conversion is performed at a carrier frequency at which a calorific value of the motor 20 and the inverter 30 is maximized out of carrier frequencies capable of implementing a target output of the motor 20, no matter how large or small a required calorific value set by the air conditioning controller 70 is. Also in this case, it is possible to actively control a calorific value of the motor 20 and the inverter 30 by intentionally using a carrier frequency at which motor efficiency is low (motor loss is large and a calorific value is large). Then, in Step S9, heat generated by the motor 20 and the inverter 30 is used for air conditioning by way of cooling water.

On the other hand, in Step S11, for instance, the inverter control device 31 determines whether the state of charge (SOC) of the drive power battery 90 is a full charge state. When the determination result in Step S11 is YES, the routine proceeds to Step S8, and when the determination result in Step S11 is NO, the routine proceeds to Step S12. Note that the reason why the routine proceeds to Step S8 when the determination result in Step S11 is YES is because the state of charge of the battery 90 is not excessively lowered even when a vehicle travels in a state that efficiency of the motor 20 is low. In this case, the inverter control device 31 corresponds to a determination means of the present invention.

In Step S12, the carrier frequency changing unit 32 and the electric power conversion device 33 perform inverter control i.e. electric power conversion at a carrier frequency at which motor efficiency is high. This makes it possible to implement traveling in a state that motor efficiency is prioritized, with less electric power consumption, thereby saving electric power of the battery 90. In this case, the carrier frequency changing unit 32 and the electric power conversion device 33 correspond to an execution means of the present invention.

(4) Advantageous Effects

As described above, in the embodiment, the following features are provided by the air conditioning device 10 for an electric vehicle, which is provided only with the motor 20 as a drive source.

The heater core 14 for heating conditioning air by using cooling water as a heat source is disposed on the circulation passage 50 for the cooling water for cooling cool both of the motor 20, and the inverter 30 for controlling an output of the motor 20 by changing a carrier frequency.

The air conditioning controller 70 sets a required calorific value of the motor 20 and the inverter 30 according to a vehicle compartment temperature requested by a passenger.

The carrier frequency changing unit 32 sets a carrier frequency at which a calorific value of the motor 20 and the inverter 30 is made equal to a required calorific value of the motor 20 and the inverter 30 set by the air conditioning controller 70 out of carrier frequencies capable of implementing a target output of the motor 20 set by the vehicle controller 60 depending on a traveling state of a vehicle.

The electric power conversion device 33 converts direct-current power of the drive power battery 90 into alternating-current power by a carrier frequency set by the carrier frequency changing unit 32, and supplies the alternating-current power to the motor 20.

According to the aforementioned configuration, in the air conditioning device 10 for an electric vehicle, which is provided only with the motor 20 as a drive source and is likely to be short of a heat source for warming the interior of a vehicle compartment, the heater core 14 is disposed on the circulation passage 50 for cooling water for cooling both of the motor 20 and the inverter 30. Therefore, heat generated by the motor 20 and the inverter 30 is used for heating conditioning air. Thus, it is possible to provide the vehicular air conditioning device 10 that enables to secure a heat source for warming the interior of a vehicle compartment, without adding an electric heater or the like such as a PTC heater.

Further, the air conditioning controller 70 is configured to set a required calorific value of the motor 20 and the inverter 30 according to a vehicle compartment temperature requested by a passenger. The carrier frequency changing unit 32 is configured to set a carrier frequency at which a calorific value of the motor 20 and the inverter 30 is made equal to the required calorific value of the motor 20 and the inverter 30 out of carrier frequencies capable of implementing a target output of the motor 20 to be set depending on a traveling state of a vehicle. The electric power conversion device 33 performs electric power conversion at the set carrier frequency. This makes it possible to implement a vehicle compartment temperature requested by a passenger sufficiently and precisely, while retaining a target output of the motor 20 unchanged.

Specifically, in the embodiment, a carrier frequency at which a calorific value of the motor 20 and the inverter 30 is made equal to a required calorific value of the motor 20 and the inverter 30 is set, in other words, a carrier frequency is set in terms of a calorific value of the motor 20 and the inverter 30. Therefore, as compared with a configuration, in which a carrier frequency is set based on the premise that motor efficiency is prioritized, it is easy to make a calorific value of the motor 20 and the inverter 30 equal to a required calorific value of the motor 20 and the inverter 30. Further, a calorific value of the motor 20 and the inverter 30 basically depends solely on a carrier frequency. Therefore, it is possible to estimate a calorific value of the motor 20 and the inverter 30 with high precision, and to implement a required calorific value of the motor 20 and the inverter 30 with precision. This does not require feedback control of a carrier frequency, for instance, in order to make a calorific value of the motor 20 and the inverter 30 equal to a required calorific value of the motor 20 and the inverter 30. This is advantageous in avoiding complication of the control, and in shortening a time required for making a calorific value equal to a required calorific value. Further, this is also advantageous in avoiding wasteful heat generation due to overshooting. Furthermore, even when feedback control is performed, it is possible to speedily make a calorific value of the motor 20 and the inverter 30 equal to a required calorific value of the motor 20 and the inverter 30.

In the embodiment, the carrier frequency changing unit 32 sets a carrier frequency at which a calorific value of the motor 20 and the inverter 30 is maximized out of carrier frequencies capable of implementing a target output of the motor 20 until a predetermined time lapses after the motor 20 starts operating (e.g. a time (e.g. 5 minutes), which is required for a temperature of cooling water to reach a temperature (e.g. from 40 to 50° C.) usable for air conditioning) lapses), no matter how large or small a required calorific value set by the air conditioning controller 70 is (YES in Step S4) (Step S13).

According to the aforementioned configuration it is possible to raise a temperature of cooling water as fast as possible during an initial stage after the motor 20 starts operating, during which it is necessary to rapidly heat the cooling water, and to secure a heat source for warming the interior of a vehicle compartment in an early stage. Thus, it is possible to implement an optimum air conditioned state with enhanced responsiveness to a passenger's request for warming from an initial stage after a vehicle starts traveling.

In the embodiment, when it is impossible to secure a required calorific value set by the air conditioning controller 70 by 100% (YES in Step S5), the inverter control device 31 sets a securable calorific value, and the air conditioning controller 70 reduces the flow rate of conditioned air to keep a temperature of conditioned air to a vehicle compartment temperature requested by a passenger by the securable calorific value set by the inverter control device 31.

According to the aforementioned configuration, even when it is impossible to secure a required calorific value by 100%, it is possible to keep a temperature of conditioned air to a vehicle compartment temperature requested by a passenger, while prioritizing securing a target output of the motor 20 by 100%.

In the embodiment, the inverter control device 31 determines whether the drive power battery 90 is in a full charge state (Step S11). When the inverter control device 31 determines that the drive power battery 90 is in a full charge state (YES in Step S11), the carrier frequency changing unit 32 and the electric power conversion device 33 perform electric power conversion at a carrier frequency at which motor efficiency is low, as compared with a case, in which it is determined that the drive power battery 90 is not in a full charge state (NO in Step S11).

According to the aforementioned configuration, when the drive power battery 90 is in a full charge state, even when a vehicle travels in a state that motor efficiency is low, the state of charge of the battery 90 is not excessively lowered. Further, when the drive power battery 90 is not in a full charge state, it is possible to implement traveling in a state that motor efficiency is prioritized, with less electric power consumption, thereby saving electric power of the battery 90.

In the embodiment, only the heat generating characteristics when a carrier frequency is 10 kHz and 5 kHz are prepared. Alternatively, it is possible to prepare heat generating characteristics for a larger number of carrier frequencies so that it is possible to select a carrier frequency from among the larger number of carrier frequencies.

Further, cooling water may be gas for air conditioning. Further alternatively, it is possible to cool either one of the motor 20 and the inverter 30.

Further, the present invention is also applicable to a hybrid vehicle, in place of an electric vehicle.

The following is a summary of the features of the present invention.

The present invention is directed to an air conditioning device for use in a vehicle provided with a motor as a drive source, and an inverter for controlling an output of the motor by changing a carrier frequency. The vehicular air conditioning device includes a heater core disposed on a circulation passage for coolant for cooling at least one of the motor and the inverter, and configured to heat conditioning air by using the coolant as a heat source; a required calorific value setting means which sets a required calorific value of the motor and the inverter according to a vehicle compartment temperature requested by a passenger; a carrier frequency setting means which sets a carrier frequency at which a calorific value of the motor and the invertor is made equal to the required calorific value set by the required calorific value setting means, out of carrier frequencies capable of implementing a target output of the motor to be set depending on a traveling state of the vehicle; and an electric power conversion means which converts direct-current power of a power storage device into alternating-current power at the carrier frequency set by the carrier frequency setting means, and supplies the alternating-current power to the motor.

According to the present invention, in an air conditioning device for a vehicle, which is provided with a motor as a drive source and is likely to be short of a heat source for warming the interior of a vehicle compartment, a heater core is disposed on a circulation passage for coolant for cooling at least one of the motor and the inverter. Therefore, it is possible to use heat generated by the motor and the inverter for heating conditioning air. Thus, it is possible to provide a vehicular air conditioning device that enables to secure a heat source for warming the interior of a vehicle compartment without adding an electric heater or the like.

Further, a required calorific value of the motor and the inverter is set according to a vehicle compartment temperature requested by a passenger. A carrier frequency at which a calorific value of the motor and the inverter is made equal to the required calorific value of the motor and the inverter is set out of carrier frequencies capable of implementing a target output of the motor to he set depending on a traveling state of a vehicle. Electric power conversion is performed at the set carrier frequency. According to the aforementioned configuration, it is possible to implement a vehicle compartment temperature requested by a passenger sufficiently and precisely, while retaining a target output of the motor unchanged.

In view of electric power consumption of a vehicle as a whole, there may be an idea that a carrier frequency is set based on the premise that motor efficiency is prioritized, as in the conventional art (i.e. a carrier frequency is set to such a value that motor loss is made as small as possible, and consequently, a calorific value of a motor and an inverter is made as small as possible), heat generated by the heater and the inverter is used as a heat source for warming the interior of a vehicle compartment, and shortage of calorific value is compensated by an electric heater or the like. However, when an electric heater or the like is added, the following drawback may occur, in addition to the aforementioned problem Le. an increase in the weight and the cost of a vehicle.

Specifically, when a carrier frequency is set based on the premise that motor efficiency is prioritized, it may be difficult to grasp how much heat is generated by a motor and an inverter, in other words, to estimate a calorific value of the motor and the inverter. Therefore, it is necessary to perform feedback control of an electric heater or the like in order to make a total calorific value (=a calorific value of the motor and the inverter+a calorific value of the electric heater or the like) equal to a target calorific value by compensating shortage of calorific value. This may complicate the control and take time to make a total calorific value equal to a target calorific value. Further, wasteful heat generation due to overshooting is unavoidable. Furthermore, when a PTC heater is used as an electric heater, for instance, fine feedback control is necessary, which takes time, because a calorific value of the heater depends on a temperature of a heating portion of the heater.

Contrary to the above, in the present invention, a carrier frequency at which a calorific value of a motor and an inverter is made equal to a required calorific value of the motor and the inverter is set. In other words, a carrier frequency is set in terms of a calorific value of a motor and an inverter. This makes it easy to make a calorific value of the motor and the inverter equal to a required calorific value of the motor and the inverter. Further, a calorific value of a motor and an inverter basically depends solely on a carrier frequency, when it is assumed that a target output of the motor is retained unchanged. This makes it possible to estimate a calorific value of the motor and the inverter with high precision, and to implement a required calorific value of the motor and the inverter with precision. This does not require feedback control of a carrier frequency, for instance, in order to make a calorific value of a motor and an inverter equal to a required calorific value of the motor and the inverter. Even when feedback control of a carrier frequency is performed, it is possible to speedily make a calorific value of a motor and an inverter equal to a required calorific value of the motor and the inverter.

To summarize the above, a feature of the present invention is to control a carrier frequency in response to a request for air conditioning, taking into consideration that in using heat generated by a motor and an inverter for air conditioning, as the carrier frequency increases, motor loss increases, even when the motor is driven at a same torque, and a calorific value of the motor and the inverter increases. In view of the above, in the present invention, in order to make a calorific value of a motor and an inverter equal to a required calorific value of the motor and the inverter set in response to a passenger's request, electric power conversion is performed at a carrier frequency capable of implementing the aforementioned required calorific value, without performing electric power conversion at a carrier frequency at which motor efficiency is as high as possible out of carrier frequencies capable of implementing a target output of the motor. In other words, contrary to the conventional art, in the present invention a carrier frequency at which motor efficiency is low (motor loss is large and a calorific value is large) is intentionally used, without performing control in which motor efficiency is prioritized. Thus, a calorific value of a motor and an inverter is actively controlled and used for air conditioning.

In the present invention, preferably, the carrier frequency setting means may set a carrier frequency at which the calorific value of the motor and the inverter is maximized, out of the carrier frequencies capable of implementing the target output of the motor, until a predetermined time lapses after the motor starts operating, no matter how large or small the required calorific value set by the required calorific value setting means is.

During an initial stage after the motor starts operating, a calorific value of the motor and the inverter is small. Therefore, a temperature of the motor and a temperature of the inverter are low, and a temperature of the coolant is also low. However, when warming the interior of a vehicle compartment is requested from an initial stage after a vehicle starts traveling, it is necessary to rapidly raise the temperature of the coolant from the initial stage after the motor starts operating. In view of the above, according to the aforementioned configuration, a carrier frequency at which a calorific value of the motor and the inverter is maximized is set until a predetermined time lapses after the motor starts operating. This makes it possible to raise the temperature of the coolant as fast as possible during an initial stage, necessary for rapidly heating the coolant, after the motor starts operating and to secure a heat source for warming the interior of a vehicle compartment in an early stage. Thus, it is possible to implement an optimum air conditioned state with enhanced responsiveness to a passenger's request for warming from an initial stage after the vehicle starts traveling.

In the present invention, preferably, the vehicular air conditioning device may be further provided with a securable calorific value setting means which sets a securable calorific value when it is impossible to secure the required calorific value set by the required calorific value setting means by 100%; and a conditioned air flow rate reducing means which reduces a flow rate of conditioned air to keep a temperature of conditioned air to a vehicle compartment temperature requested by a passenger with the securable calorific value set by the securable calorific value setting means.

According to the aforementioned configuration, it is possible to keep a temperature of conditioned air to a vehicle compartment temperature requested by a passenger, while prioritizing securing a target output of the motor by 100%, even when a required calorific value is not secured by 100%.

According to the present invention, preferably, the vehicular air conditioning device may be further provided with a determination means which determines whether the power storage device is in a full charge state; and an execution means which performs electric power conversion at a carrier frequency at which efficiency of the motor is low when the determination means determines that the power storage device is in a full charge state, as compared with a case in which the determination means determines that the power storage device is not in a full charge state.

According to the aforementioned configuration, when the power storage device is in a full charge state, the charging state of the power storage device is not excessively lowered even when the vehicle travels in a state that motor efficiency is low. Further, when the power storage device is not in a full charge state, it is possible to implement traveling in which motor efficiency is prioritized, with less electric power consumption, thereby saving electric power of the power storage device.

The present application is based on Japanese Patent Application No. 2014-008275 filed on Jan. 21, 2014, the contents of which are hereby incorporated by reference.

Although the present invention has been appropriately and fully described by way of the embodiment with reference to the drawings to describe the present invention, it is to be appreciated that those skilled in the art can easily change and/or modify the embodiment. Therefore, as far as such modifications or alterations to be implemented by those skilled in the art do not depart from the scope of the present invention hereinafter defined, such modifications or alterations should be construed as being included therein.

INDUSTRIAL APPLICABILITY

As described above, the present invention provides a vehicular air conditioning device that enables to secure a heat source for warming the interior of a vehicle compartment without adding an electric heater or the like. Therefore, the present invention contributes to development and improvement of the technique relating to an air conditioning device for an electric vehicle or for a hybrid vehicle, which is provided with a motor as a drive source, and is likely to be short of a heat source for warming the interior of a vehicle compartment.

The invention claimed is:

1. A vehicular air conditioning device comprising:
  a motor which is provided on a vehicle as a drive source;
  an inverter for controlling an output of the motor by changing, a carrier frequency;
  a heater core disposed on a circulation passage for coolant for cooling at least one of the motor and the inverter, and configured to heat conditioning air by using the coolant as a heat source;
  a required calorific value setting device which sets a required calorific value of the motor and the inverter according to a vehicle compartment temperature requested by a passenger;
  a carrier frequency setting device which sets a first carrier frequency at which a calorific value of the motor and the inverter is made equal to the required calorific value set by the required calorific value setting device with implementing a target output of the motor which depends on a traveling state of the vehicle, the first carrier frequency being prioritized over a second carrier frequency whose motor efficiency is higher among a plurality of carrier frequencies capable of implementing the target output of the motor, the plurality of carrier frequencies comprising the first carrier frequency and the second carrier frequency; and an electric power conversion device which converts direct-current power of a power storage device into alternating-current power at the first carrier frequency set by the carrier frequency setting device, and supplies the alternating-current power to the motor.

2. The vehicular air conditioning device according to claim 1, wherein the carrier frequency setting device sets a third carrier frequency at which the calorific value of the motor and the inverter is maximized, out of the carrier frequencies capable of implementing the target output of the motor, until a predetermined time lapses after the motor starts operating, no matter how large or small the required calorific value set by the required calorific value setting device is.

3. The vehicular air conditioning device according to claim 1, further comprising:

a securable calorific value setting device which sets a securable calorific value when it is impossible to secure the required calorific value set by the required calorific value setting device by 100%; and a conditioned air flow rate reducing device which reduces a flow rate of conditioned air to keep a temperature of conditioned air at a vehicle compartment temperature requested by a passenger with the securable calorific value set by the securable calorific value setting device.

4. The vehicular air conditioning device according to claim 1, further comprising:

a determination device which determines whether the power storage device is in a full charge state; and an execution device which performs electric power conversion at a third carrier frequency at which efficiency of the motor is low when the determination device determines that the power storage device is in a full charge state, as compared with a case in which the determination device determines that the power storage device is not in a full charge state.

5. The vehicular air conditioning device according to claim 1, wherein the carrier frequency setting device sets a highest carrier frequency among the plurality of carrier frequencies capable of implementing the target output of the motor, until a predetermined time lapses after the motor starts operating, no matter how large or small the required calorific value.

6. The vehicular air conditioning device according to claim 5, wherein after the predetermined time elapses, the carrier frequency setting device sets a third carrier frequency, which is lower than that of the highest carrier frequency until the predetermined time lapses after the motor starts operating.

7. The vehicular air conditioning device according to claim 1, wherein the target output is calculated by multiplying a target torque with a target rotation number.

8. An air conditioning device for use in a vehicle, the air conditioning device comprising:

a motor which is provided on the vehicle as a drive source;

an inverter for controlling an output of the motor by changing a carrier frequency;

an air conditioning device, which has a circulation passage for coolant for cooling at least one of the motor and the inverter, and the air conditioning device uses the coolant as a heat source;

a required calorific value setting device which sets a required calorific value of the motor and the inverter according to a vehicle compartment temperature requested by a passenger; and a carrier frequency setting device which sets a first carrier frequency at which a calorific value of the motor and the inverter is made equal to the required calorific value set by the required calorific value setting device with implementing a target output of the motor which depends on a traveling state of the vehicle, the first carrier frequency being prioritized over a second carrier frequency whose motor efficiency is higher among a plurality of carrier frequencies capable of implementing the target output of the motor, the plurality of carrier frequencies comprising the first carrier frequency and the second carrier frequency.

9. The air conditioning device according to claim 8, wherein the carrier frequency setting device sets a highest carrier frequency among the plurality of carrier frequencies capable of implementing the target output of the motor, until a predetermined time lapses after the motor starts operating, no matter how large or small the required calorific value.

10. The air conditioning device according to claim 9, wherein after the predetermined time elapses, the carrier frequency setting device sets a third carrier frequency, which is lower than that of the highest carrier frequency until the predetermined time lapses after the motor starts operating.

11. The air conditioning device according to claim 8, wherein the target output is calculated by multiplying a target torque with a target rotation number.

* * * * *